United States Patent [19]

Köbler et al.

[11] Patent Number: 4,487,123
[45] Date of Patent: Dec. 11, 1984

[54] SHOCK AND OSCILLATION REDUCING SYSTEMS FOR PRINTING MACHINE CYLINDERS

[75] Inventors: Ingo Köbler, Anhausen; Herbert Stockel, Augsburg; Lutz Mauer, Friedberg; Albert Engl, Warngau, all of Fed. Rep. of Germany

[73] Assignee: M.A.N. Roland Druckmaschinen Aktiengesellschaft, Offenbach am Main, Fed. Rep. of Germany

[21] Appl. No.: 521,654

[22] Filed: Aug. 10, 1983

[30] Foreign Application Priority Data

Aug. 13, 1982 [DE] Fed. Rep. of Germany ....... 3230120

[51] Int. Cl.³ .............................................. B41F 5/00
[52] U.S. Cl. ................................... 101/216; 101/219; 74/574
[58] Field of Search ................. 101/216, 219; 74/574, 74/604

[56] References Cited

U.S. PATENT DOCUMENTS

| | | | |
|---|---|---|---|
| 1,896,292 | 2/1933 | Dorn | 74/574 X |
| 3,040,598 | 6/1962 | Warren | 74/574 |
| 3,075,406 | 1/1963 | Butler, Jr. et al. | 74/574 |
| 3,521,340 | 7/1970 | Gallant et al. | 74/574 X |
| 4,125,073 | 11/1978 | Bain | |

FOREIGN PATENT DOCUMENTS

| | | | |
|---|---|---|---|
| 3012060 | 10/1981 | Fed. Rep. of Germany | 101/216 |
| 2073368 | 10/1981 | United Kingdom | 101/216 |

*Primary Examiner*—Edgar S. Burr
*Assistant Examiner*—John A. Weresh
*Attorney, Agent, or Firm*—Frishauf, Holtz, Goodman & Woodward

[57] ABSTRACT

To suppress shocks and bending oscillations arising upon roll-off of grooves (7, 8) of printing or blanket cylinders (3, 4) the blanket cylinders are constructed as hollow elements within which an absorber rod (12) is located, secured by a transversely extending member (11). The absorber rod which has propeller-like vanes, buckets or extensions (8) secured to its ends, the transversely extending member, and if provided, inertia masses secured to the end portions of the absorber rod are all embedded within a damping material filling the interior of the cylinder. The damping masses can be formed with the radial projections, vanes, buckets or propeller-like extensions (18), all embedded within the damping mass.

15 Claims, 5 Drawing Figures

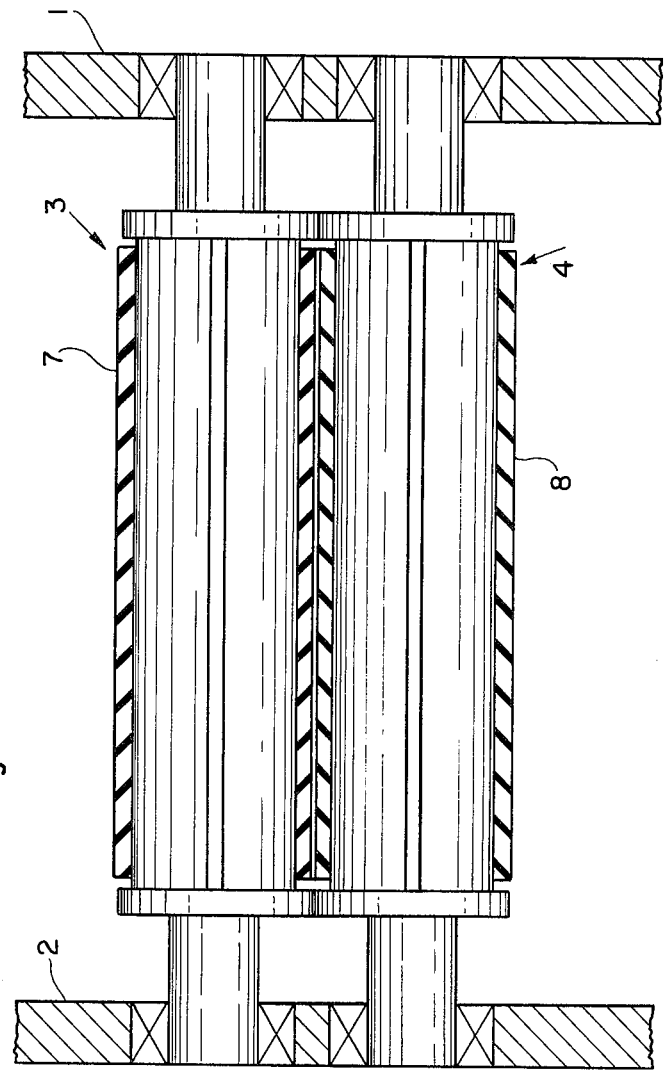
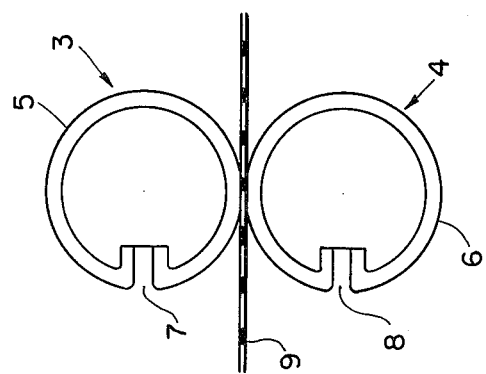

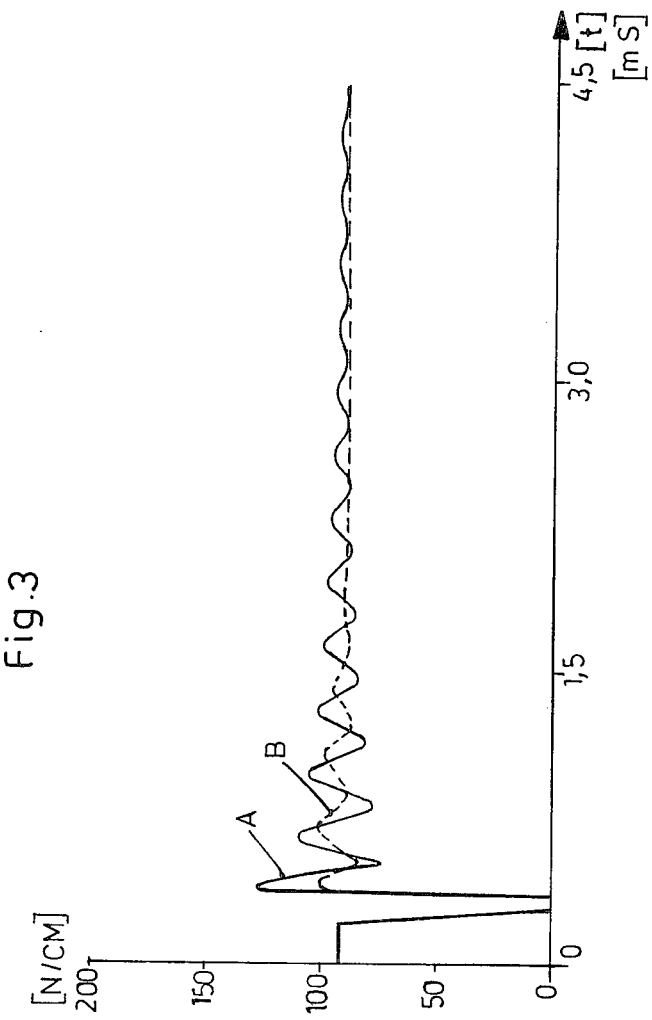

SHOCK AND OSCILLATION REDUCING SYSTEMS FOR PRINTING MACHINE CYLINDERS

The present invention relates to printing machines and more particularly to reduce the shock and oscillations which arise in printing machine cylinders when cylinders formed with a groove to retain a blanket, or printing plate thereon roll off against other cylinders, and more particularly against another cylinder which is formed with a similar groove.

BACKGROUND

It has previously been proposed to provide for damping of cylinders in printing machines as the cylinders roll off against each other and portions formed with grooves therein meet each other. Shocks will arise which result in bending oscillations of the printing machine cylinders. The damping system described in the referenced U.S. Pat. No. 4,125,073 is intended to reduce the amplitude of these bending oscillations so that they will attenuate rapidly. In accordance with the proposal, a ball fitted within a slit is eccentrically positioned in the cylinder. The ball, due to centrifugal force, will engage the inner wall of the cylinder. The ball is accelerated in the direction of the central axis of the cylinder due to the impact or shock to which the cylinder is subjected just after the groove has rolled off against an engaging cylinder. As the cylinder continues to rotate, centrifugal force again causes the ball to engage the inner wall of the cylinder. This occurs in advance of completion of the revolution of the cylinder, that is, in advance of the next roll-off event of the groove of the cylinder against an adjacent cylinder. It has been found that such an arrangement causes disturbances within the cylinder.

THE INVENTION

It is an object to provide an arrangement in which the amplitudes of bending oscillations are effectively reduced without causing disturbances within the interior of the respective cylinder of the printing system.

Briefly, the cylinder, which in general, is hollow is formed with a transversely extending member, for example a transversely extending disc, or transversely extending bar and transferring oscillations and shocks from the cylinder wall. An absorber rod, or a plurality of rods are provided, extending parallel to the axis of the cylinder fitted within, and connected to the transversely extending member. Vanes, buckets or blades are recessed to the ends of the absorber rod. A damping mass fills the space within the cylinder and embeds the absorber rods, to dissipate shocks and oscillations transferred from the transversely extending member to the absorber rod, to provide for absorption of shocks, oscillations and vibrations while preventing disturbances, and uncontrolled movement of free elements within the cylinder.

DRAWINGS

FIG. 1 is a schematic side view of two cylinders located between side walls of a printing machine;

FIG. 2 is a schematic end view of the cylinder of FIG. 1;

FIG. 3 is a graph of bending of a rotating printing cylinder, with respect to time;

DETAILED DESCRIPTION

Figure 4:
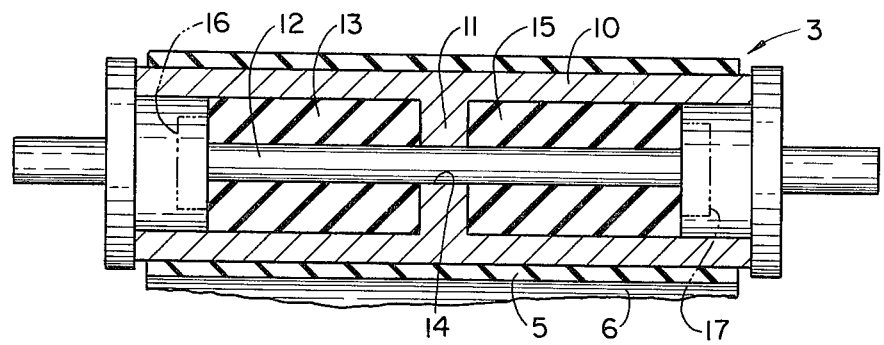
FIG. 4 is a longitudinal schematic cross-section through a cylinder damped in accordance with the present invention.

FIGS. 1 and 2 show, highly schematically, the arrangement of a pair of printing cylinders 3, 4, journaled in side walls 1, 2 of a printing machine. These cylinders are typical for rotary offset printing machines, and have, respectively, printing blankets 5, 6 secured to the circumferences thereof. The blankets are attached to the cylinders in attachment grooves 7, 8, as well known, and in accordance with any suitable clamping or attachment mechanism. As seen in FIG. 2, the cylinder arrangement as shown can provide for double sided printing on a paper web 9, the respective blanket cylinders forming carriers of printing information, as well as the respective impression of printing cylinders of the machine. The ends of the cylinder 3 may have bearer rings secured thereto. In operation, the grooves 7, 8 of the cylinders will roll off against each other. The rubber blanket cylinders 3, 4, are pressed towards each other. As best seen in FIG. 3, and as the cylinders rotate, compressive force along the impression, or imprint or printing line will decrease and may drop to zero as the grooves are opposite each other—see FIG. 3. Upon further rotation of the cylinders, and after the cylinder grooves 7, 8, have passed each other, and the edges of the grooves meet each other, a substantial shock will result which may lead to disturbances within the printed image, for example striping or the like, as well as to premature damage and wear of the blankets, as well as the bearer rings 3a, 4a, if provided. The curve A of FIG. 3 illustrates the attenuation of the oscillations, with respect to time, which decay only gradually as the cylinder continues to rotate.

In accordance with the present invention, and in order to decrease the decaying oscillations as shown in FIG. 3, curve A, the cylinder 3 is fitted with an oscillation absorbing system. Looked at axially, a transversely extending member 11 is located within the cylinder, approximately in the center of the cylinder. The member 11, in form of a transversely extending bar, rod, or disc may be made of metal, typically steel, welded to the inside of the wall 10 of the cylinder 3. An absorber rod 12, preferably also made of steel is fitted within an opening 14 of the transversely extending member 11. It is located symmetrically therein, and securely retained in the opening, for example by a press fit.

The absorber rod 12 has free ends and is elastic. It is embedded within a damping mass 13, 15 which fills the cylinder 3. The rod, or absorber 12 is preferably located at the center axis of the cylinder 3 in order to avoid unbalances; it may be slightly offset, however, to compensate unbalances which might arise due to other apparatus associated within the cylinder. The damping value of the damping mass 13, 15, suitably is: $d_m > 5 \times 10^4 [N_s/m]$.

In a preferred form, the transverse element 11 is located in the center of the printing cylinder 3 if the groove 7 in the printing cylinder 3 extends over the entire axial length thereof. At this position, the bend-through of the cylinder, due to the impact of the edge of the groove rolling off the companion cylinder is a maximum.

Figure 5:
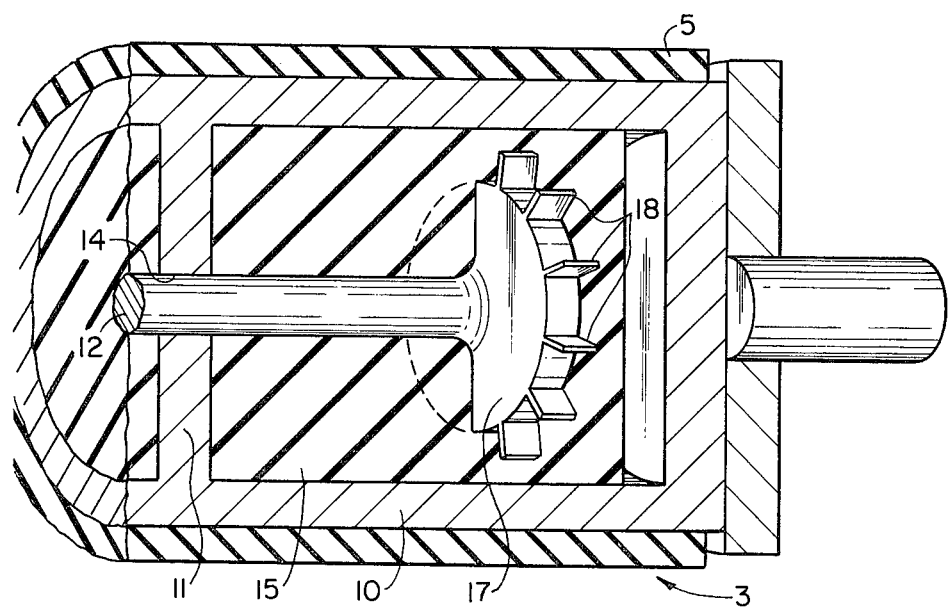
FIG. 5 is an enlarged end sectional view of a modification of the end portion of a damping element.

The free ends of the absorber rod 12 may have additional inertia masses 16, 17 secured thereto. These additional inertia masses are embedded in masses 13, 15 (FIG. 5). As the cylinder grooves 7, 8 roll off against each other, a substantial shock will occur as the portions of the cylinders at the edges of the groove meet each other—see FIG. 3, curve A. This shock is substantially reduced by the absorber 12—see broken line curve B, FIG. 3. The oscillations are damped and will decay much more quickly than those of curve A, which are essentially undamped. The absorber rod 12 is so arranged, by controlling its length and its profile, or cross-section, that the inherent oscillations of the oscillating system formed by the overall mass and the absorber rod has a predetermined frequency, preferably that of the inherent bending frequency of the printing cylinder when excited by the shock as the edge of the groove meets the surface of an opposing cylinder, for example the edge of the groove 8 of cylinder 4. The oscillating energy of the absorber 12 is dissipated by the surrounding damping masses 13, 14. The oscillations, and their frequencies absent the absorber rod and the damping masses 13, 15, can readily be determined by suitable measuring instruments, and the damping masses and absorber rod characteristics then designed accordingly.

In accordance with standard rotary offset printing machine construction, the cylinders 3, 4, are pressed against each other with a predetermined pressure force. Upon release of this pressure force, that is, as a groove 7, 8, rolls off against the facing impression or printing cylinder, the pressure will be unloaded and, again, bending oscillations will result which are also damped by the absorber 12 and the damping masses 13, 15.

Torsional oscillations may also result. They can easily be suppressed, if, in accordance with a feature of the invention, the end portions of the absorber rod 12 are formed with projecting blades or buckets, similar to turbine buckets or blades. Such blades or buckets can be secured to the additional inertia masses 16, 17—see FIG. 5—in which only the right half of the printing cylinder shown in FIG. 4 is illustrated. The absorber rod 12 has an additional inertia mass 17 secured thereto which has buckets or vanes or blades 18 located around the circumference thereof in the form of projections, similar to a propeller. The inertia mass 17, as well as the projections 18 are embedded within the damping mass 15, to thereby effectively dampen torsional oscillations.

A plurality of damping rods 12, with or without the additional inertia masses may be used, rather than merely a single one as shown in FIGS. 4 and 5. The absorber rods, then, are preferably symmetrically located within the cylinder.

The arrangement shown in FIG. 4 is located in the upper blanket cylinder 3, but can be equally used in the lower blanket cylinder 4, as well as in plate cylinders, cooperating with the blanket cylinders. The plate cylinders have not been shown for clarity of the drawing. Any one of the cylinders may have one or more absorber rods located therein.

Various changes and modifications may be made and features described in connection with any one of the embodiments may be used with any of the others, within the scope of the inventive concept.

Suitable materials for the inertia masses 13, 15, are elastromers for example rubber based materials, gum arabic, or the like.

We claim:

1. In a rotary printing machine having a hollow first cylinder (3) formed with a groove (7) to receive end portions of a covering (5) for the cylinder, and a second cylinder (4) in surface engagement with said first cylinder,
    means including a movable mass for reducing the shock on the first cylinder, when, in operation, the groove thereof rolls over the second cylinder,
    comprising, in accordance with the invention a member (11) extending transversely within the cylinder (3), said member transferring oscillations and shocks from the wall of the cylinder;
    an absorber rod (12) extending parallel to the groove (7) of the cylinder (3) fitted within the cylinder, and positively secured to the cylinder only through the transversely extending member (11) such that oscillations and shocks are transferred thereto and are thereby subjected to deflecting forces;
    a damping mass (13, 15) filling the space within the cylinder, embedding said absorber rod, (12) and dissipating shocks and oscillations transferred to said damping mass by the transversely extending member (11) via said absorber rod,
    and blades, (18) extending circumferentially from axially opposite ends of said absorber rod (12) and embedded within said damping mass (13, 15) the ends of said blades being spaced from the inside of said hollow cylinder.

2. Shock absorbing means as claimed in claim 1 wherein said transversely extending member extends diametrically through the cylinder (3) and is located axially centrally therein.

3. Shock absorbing means as claimed in claim 1 wherein the absorber rod (12) is symmetrically secured to said transversely extending member, the damping mass surrounding and embedding said transversely extending member as well as said absorber rod.

4. Shock absorbing means as claimed in claim 1 further including inertia masses (16, 17) located at axially opposite ends of the absorber rod, said inertia masses having centers of gravity located at the center line of the cylinder (3).

5. Shock absorbing means as claimed in claim 4 wherein said inertia masses are embedded within the damping mass (13, 15).

6. Shock absorbing means as claimed in claim 5 wherein the damping mass (13, 15) has a damping coefficient of $d_m > 5 \times 10^4 [N_s/m]$.

7. Shock absorbing means as claimed in claim 1 wherein said absorber rod is elastic.

8. Shock absorbing means as claimed in claim 1 wherein said absorber rod is steel.

9. Shock absorbing means as claimed in claim 6 wherein said absorber rod is a metal rod; the transversely extending member is located centrally within the cylinder (3) and extends diametrically thereof, and said absorber rod (12) is symmetrically secured to the transversely extending member, and has a center of gravity which coincides with the center line or axis of the cylinder (3).

10. Shock absorbing means as claimed in claim 9 wherein said inertia masses are embedded within the damping mass (13, 15).

11. Shock absorbing means 5 wherein the blades (18) extend from said absorber masses.

12. Shock absorbing means as claimed in claim 10 wherein the blades (18) extend from said absorber masses.

13. Shock absorbing means as claimed in claim 1 wherein the absorber rod has axially opposite unconnected, free ends, embedded in said damping mass (13, 15).

14. Shock absorbing means as claimed in claim 5 wherein the absorber rod has axially opposite unconnected, free ends, embedded in said damping mass (13, 15).

15. Shock absorbing means as claimed in claim 9 wherein the absorber rod has axially opposite unconnected, free ends, embedded in said damping mass (13, 15).

* * * * *